March 23, 1926.
J. G. DAVIS
REFLECTOR
Filed Oct. 7, 1924
1,578,079
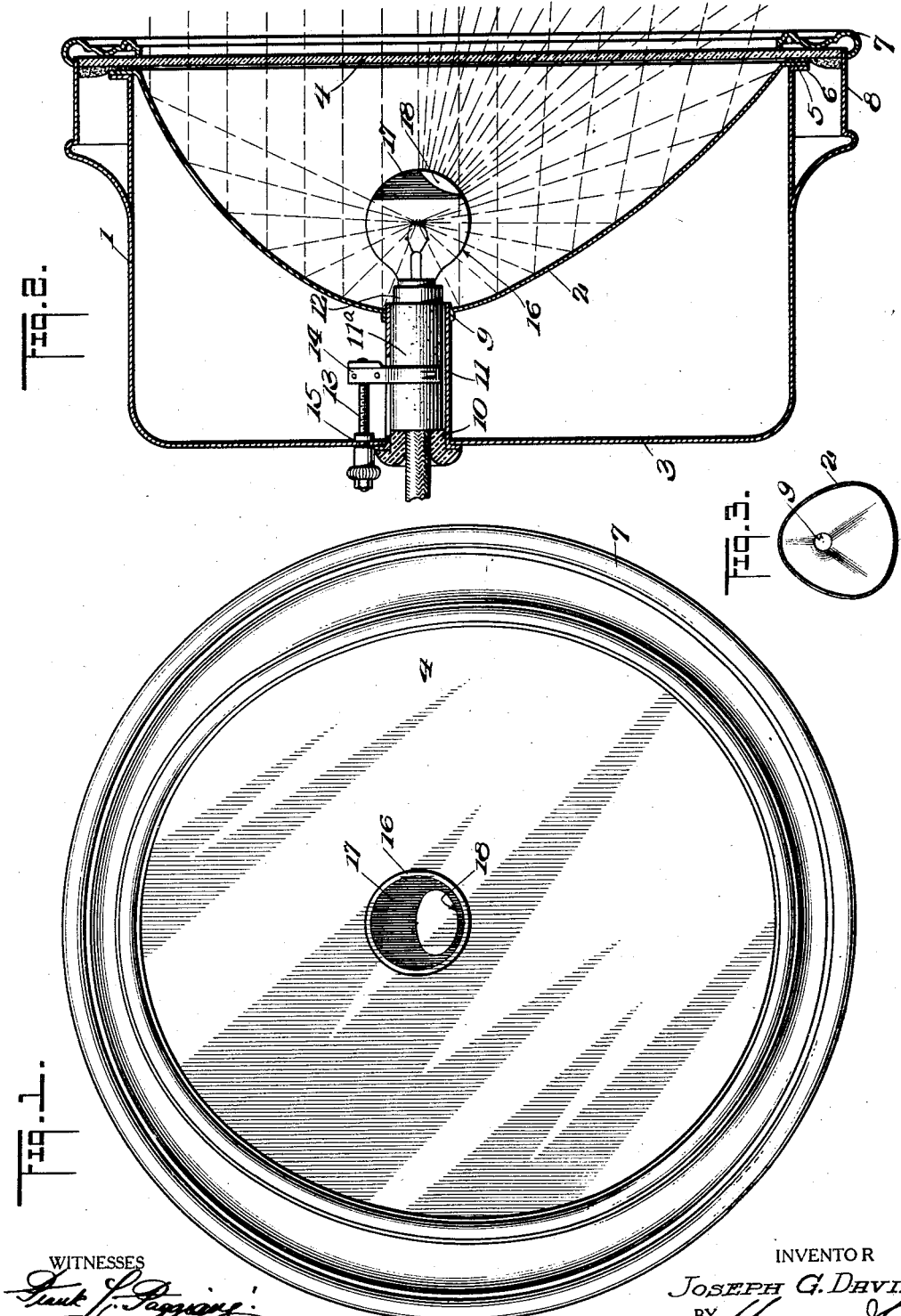
INVENTOR
JOSEPH G. DAVIS.
BY
ATTORNEYS Patented Mar. 23, 1926.

1,578,079

UNITED STATES PATENT OFFICE.

JOSEPH GEORGE DAVIS, OF DALLAS, TEXAS, ASSIGNOR OF ONE-HALF TO LOUIE L. THALHEIMER, OF DALLAS, TEXAS.

REFLECTOR.

Application filed October 7, 1924. Serial No. 742,188.

*To all whom it may concern:*

Be it known that I, JOSEPH G. DAVIS, a citizen of the United States, and a resident of Dallas, in the county of Dallas and State of Texas, have invented certain new and useful Improvements in Reflectors, of which the following is a specification.

My invention relates to improvements in reflectors for light projectors and particularly for headlights of automobiles or like vehicles, and it consists in the combinations, constructions and arrangements herein described and claimed.

An object of the invention is to provide a reflector which is adapted when used in the headlight of a vehicle to direct the rays of light from the source of light of the headlight so that practically all the rays of light are used in illuminating the roadway in front of the vehicle without producing any objectionable glare.

A further object of the invention is the provision of a reflector of the character described which is adapted to intercept the rays of light passing upwardly from a source of light with which the reflector is associated and to then direct the intercepted rays of light in a beam which is concentrated on a roadway in front of the reflector.

A further object of the invention is to provide a reflector which is adapted when incorporated in a headlight of a vehicle to direct the rays of light from the headlight downwardly and forwardly of the vehicle in a beam which enlarges in width from its forward end rearwardly or toward the vehicle.

Other objects and advantages will be apparent from the following description considered in conjunction with the accompanying drawings forming a part of this application, in which—

Figure 1 is a front view of a headlight equipped with the improved reflector,

Figure 2 is a longitudinal vertical section through the headlight, and

Figure 3 is a reduced outline of the mouth or open end of the reflector.

A headlight having a hollow body or casing 1 of any desired shape can be equipped with a reflector 2 embodying the invention. The headlight casing shown in Figures 1 and 2 has a body which is circular in cross sectional contour and is closed at its rearward end by an integral end wall 3 and at its forward end by a lens 4. The reflector 2 is provided with a marginal flange 5 which rests flatwise against a marginal flange 6 on the forward end of the body of the headlight casing and the lens 4 is held against the flange 5 by any suitable fastening means, as for example by the rim 7 which engages a supplementary annular member 8 which encircles and is attached to the forward end portion of the body of the headlight casing.

The reflector 2 is of a shape which may be described as irregularly parabolic. The portion of the inner or reflecting surface of the reflector that lies above the level of the focal center of the reflector is curved both longitudinally and transversely of the reflector along arcs of circles struck about the focal center of the reflector by radii of less length than the corresponding radii by which arcs of circles coincident with the longitudinal and transverse curves of the portion of the inner surface of the reflector that is located below the level of the focal center of the reflector are struck. The outline of the reflector in cross section at its rim therefore is substantially oval, being wider adjacent to its lower end than at any other point, as clearly shown in Figure 3.

The reflector 2 is provided with an opening 9 in alinement with an opening 10 in the end wall 3 of the headlight casing. The center line of the opening 9 extends through the focal center of the reflector and therefore is located above the level of the horizontal plane which is located midway between the highest point and the lowest point on the inner or reflecting surface of reflector. A longitudinally slotted stationary tube 11 extends through the openings 9 and 10 and supports an axially movable member 11ᵃ which carries a socket 12 at the end thereof which extends within the reflector 2. The tubular socket carrying member 11ᵃ may be moved axially within limits by turning an adjusting screw 13 which threadedly engages a nut 14 which is carried by the socket carrying member 11ᵃ, the screw 13 being parallel to the tube 11 and being supported rotatably in an opening 15 in the end wall 3 but not being permitted to move axially relatively to the end wall 3. An electric lamp 16 which is carried by the socket 12 with the filament thereof in line with the focal center of the reflector therefore can be adjusted as to position within the reflector. The bulb or globe of the lamp 16 has a portion thereof rendered opaque by being silvered externally as at 17, the opaque portion comprising all the front part of the bulb except a transparent portion 18 located at the front of the bulb and not extending above the plane of the longitudinal median line of the lamp and the level of the filament of the lamp. The particular globe illustrated in the drawing is novel but since it has been made the subject of my companion application for Letters Patent of the United States, Serial No. 742,189, filed October 7, 1924, it will not be described in further detail nor claimed in this application.

From the foregoing description of the various parts of the device, the operation thereof may be readily understood. The inner surface of the silvered portion 17 of the globe constitutes a reflector which intercepts the rays of light from the filament which otherwise would be projected from the filament of the lamp through the portion of the lens 4 directly in front of the lamp and reflects such rays of light onto the main reflector 2. The rays of light from the reflecting surface of the globe and direct from the filament of the lamp which strike the lower portion of the reflector 2 will be reflected therefrom forwardly of the headlight along lines which incline downwardly or diverge more sharply from the horizontal as the distance from the points on the reflector 2 from which such rays of light were reflected to the level of the lowest point on the reflecting surface decreases. The rays of light direct from the filament of the lamp and reflected from the reflecting surface of the globe onto the upper portion of the reflector above the level of the focal center of the reflector will be reflected forwardly and slightly downward from the horizontal, the angle of divergence of such reflected rays of light from the horizontal increasing as the distance between the points on the reflector 2 from which such rays of light are reflected and the level of the focal center of the reflector 2 decreases. As the forwardly extending dash lines in Fig. 2 indicate, the angle of divergence downwardly from the horizontal of rays of light from the reflector 2 varies according to the level on the reflector 2 from which a ray of light was reflected and increases as the level at which the ray of light was reflected approaches the level of the lowest point on the reflector. A beam of light thus will be reflected on the roadway from directly in front of a vehicle on which is mounted a headlight equipped with the reflector to a considerable distance in advance of the vehicle but all of the rays of light of the beam will be depressed more or less from the horizontal, thus obviating glare on an approaching vehicle and assuring uniform illumination of the portion of the roadway on which the beam falls. Since the reflector is substantially oval in cross section at its mouth, the beam of light will increase in width from its forward end toward the vehicle from which it is projected. The rays of light which pass from the filament of the lamp through the transparent portion 18 will all be directed forwardly and downwardly onto the portion of the roadway on which the reflected rays of light fall and thus will serve to intensify the beam of light by means of which the roadway is illuminated, practically all the rays of light from the lamp thus being used in the illumination of the roadway.

Obviously, my invention is susceptible of embodiment in forms other than that which is illustrated in the foregoing and I, therefore, consider as my own all such modifications and adaptations thereof as fairly fall within the scope of the appended claim.

I claim:

A reflector having the shape of an irregular parabola, the width of the mouth of said reflector being greatest in a plane which is located entirely below the level of the focal center of the reflector and then decreasing toward the levels of both the highest and lowest portions of the mouth of the reflector, the mouth of said reflector being wider below said plane of greatest width than above said plane and the width of the mouth of said reflector decreasing regularly and gradually from said plane of greatest width to the level of the highest part of the mouth of said reflector.

JOSEPH GEORGE DAVIS.